(12) United States Patent
Jungjohann et al.

(10) Patent No.: US 10,641,733 B2
(45) Date of Patent: May 5, 2020

(54) ACTIVE MECHANICAL-ENVIRONMENTAL-THERMAL MEMS DEVICE FOR NANOSCALE CHARACTERIZATION

(71) Applicant: National Technology & Engineering Solutions of Sandia, LLC, Albuquerque, NM (US)

(72) Inventors: Katherine L. Jungjohann, Albuquerque, NM (US); William Mook, Albuquerque, NM (US); Claire Chisholm, Albuquerque, NM (US); Michael Shaw, Tijeras, NM (US); Khalid M. Hattar, Albuquerque, NM (US); Paul C. Galambos, Albuquerque, NM (US); Andrew Jay Leenheer, Albuquerque, NM (US); Sean J. Hearne, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 271 days.

(21) Appl. No.: 15/925,118

(22) Filed: Mar. 19, 2018

(65) Prior Publication Data
US 2018/0266989 A1    Sep. 20, 2018

Related U.S. Application Data

(60) Provisional application No. 62/473,924, filed on Mar. 20, 2017.

(51) Int. Cl.
| | |
|---|---|
| G01N 27/447 | (2006.01) |
| G01N 3/02 | (2006.01) |
| G01N 3/08 | (2006.01) |
| G01N 30/60 | (2006.01) |

(52) U.S. Cl.
CPC ......... *G01N 27/44791* (2013.01); *G01N 3/02* (2013.01); *G01N 3/08* (2013.01); *G01N 30/6095* (2013.01); *G01N 2203/0017* (2013.01); *G01N 2203/0286* (2013.01)

(58) Field of Classification Search
CPC ...... G01N 27/44791; G01N 3/08; G01N 3/02; G01N 30/6095; G01N 2203/0017; G01N 2203/0286
See application file for complete search history.

(56) References Cited

U.S. PATENT DOCUMENTS

| | | | | | |
|---|---|---|---|---|---|
| 4,821,997 | A | * | 4/1989 | Zdeblick | F15C 3/04 137/486 |
| 4,943,032 | A | * | 7/1990 | Zdeblick | F15C 3/04 137/116.3 |
| 5,050,838 | A | * | 9/1991 | Beatty | F15C 5/00 251/11 |
| 6,635,226 | B1 | * | 10/2003 | Tso | B01L 3/5027 422/129 |

(Continued)

*Primary Examiner* — Mohamed K Amara
(74) *Attorney, Agent, or Firm* — Kevin W. Bieg

(57) ABSTRACT

A microelectromechanical system (MEMS) device can be used for quantitative mechanical testing of materials within a controlled (chemical and temperature) environment, with the ability for electrochemical control to the specimen, that is coupled with a complimentary in-situ characterization technique.

12 Claims, 9 Drawing Sheets

(56) References Cited

U.S. PATENT DOCUMENTS

| | | | |
|---|---|---|---|
| 6,797,187 B1* | 9/2004 | Galambos | B01J 19/0093 216/2 |
| 7,258,774 B2* | 8/2007 | Chou | B01L 3/5027 204/450 |
| 10,525,467 B2* | 1/2020 | Nielsen | B01F 13/0818 |
| 2001/0033670 A1* | 10/2001 | Tai | H04R 19/016 381/174 |
| 2002/0045272 A1* | 4/2002 | McDevitt | B01L 3/0289 436/518 |
| 2002/0160363 A1* | 10/2002 | McDevitt | C12Q 1/37 435/6.12 |
| 2002/0197622 A1* | 12/2002 | McDevitt | G01N 33/54366 435/6.12 |
| 2003/0175947 A1* | 9/2003 | Liu | B01F 11/0071 435/288.5 |
| 2004/0100677 A1* | 5/2004 | Huibers | B81B 7/0077 359/290 |
| 2005/0109743 A1* | 5/2005 | Tanabe | B23K 26/04 219/121.73 |
| 2005/0226779 A1* | 10/2005 | Oldham | B01L 3/5027 422/400 |
| 2006/0275852 A1* | 12/2006 | Montagu | B01L 3/502715 435/7.93 |
| 2007/0134721 A1* | 6/2007 | Laitenberger | G01N 33/54373 435/7.1 |
| 2007/0230721 A1* | 10/2007 | White | H04R 19/005 381/166 |
| 2007/0281288 A1* | 12/2007 | Belkin | B01L 3/502715 435/4 |
| 2008/0047836 A1* | 2/2008 | Strand | B01L 3/502715 204/644 |
| 2010/0256465 A1* | 10/2010 | Bernstein | A61B 5/150412 600/309 |
| 2010/0261159 A1* | 10/2010 | Hess | B01J 19/0046 435/6.14 |
| 2011/0027930 A1* | 2/2011 | El-Gamal | B81C 1/00301 438/51 |
| 2011/0083793 A1* | 4/2011 | Oki | G01N 33/48728 156/73.1 |
| 2011/0125058 A1* | 5/2011 | Levinson | A61B 5/14514 600/578 |
| 2011/0240801 A1* | 10/2011 | Manzoni | F02K 99/00 244/171.1 |
| 2012/0120226 A1* | 5/2012 | de Jonge | G01N 23/2204 348/80 |
| 2012/0123297 A1* | 5/2012 | Brancazio | A61B 5/1411 600/576 |
| 2012/0277697 A1* | 11/2012 | Haghgooie | A61B 5/1411 604/319 |
| 2013/0171679 A1* | 7/2013 | Lee | B01L 7/00 435/29 |
| 2013/0236882 A1* | 9/2013 | Yu | G01N 33/5091 435/5 |
| 2013/0336095 A1* | 12/2013 | Seppa | G01L 9/0016 367/137 |
| 2014/0017670 A1* | 1/2014 | Yu | G01N 35/08 435/5 |
| 2014/0342441 A1* | 11/2014 | Yu | G01N 33/50 435/287.2 |
| 2015/0088102 A1* | 3/2015 | Fine | A61M 37/00 604/891.1 |
| 2015/0267695 A1* | 9/2015 | Marsh | F04B 45/047 128/205.24 |
| 2016/0028207 A1* | 1/2016 | Cable | H01S 5/34313 372/20 |
| 2016/0131126 A1* | 5/2016 | Marsh | F04B 19/006 156/153 |
| 2016/0325284 A1* | 11/2016 | Camillo | B01L 3/5027 |
| 2017/0233785 A1* | 8/2017 | Hasan | B01L 3/5027 435/36 |

* cited by examiner

ACTIVE MECHANICAL-ENVIRONMENTAL-THERMAL MEMS DEVICE FOR NANOSCALE CHARACTERIZATION

CROSS-REFERENCE TO RELATED APPLICATION

This application claims the benefit of U.S. Provisional Application No. 62/473,924, filed Mar. 20, 2017, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to mechanical testing at the micro-to-nanoscale and, more particularly, to a microelectromechanical system (MEMS) device for quantitative testing of the mechanical properties of material samples within a controlled (chemical and temperature) environment that can be coupled with a complimentary in-situ characterization technique.

BACKGROUND OF THE INVENTION

The chemomechanical response of a material at the nanoscale is dependent upon the environment that it is in, though there is not experimental instrumentation that allows for the quantitative tensile testing of a material in conjunction with nanoscale imaging/diffraction characterization under environmental conditions. A liquid can influence a material's fracture toughness, friction, wear, elastic and plastic deformation. Fracture toughness can be affected through chemical dissolution of atomic bonds at surfaces and high stress regions such as crack tips. The liquid and gasses can also change the surface charge, and therefore the surface energy of the material, which will influence fracture toughness through the Griffith relationship. Friction and wear rates can be modified due to the influence of liquid lubrication and surface passivation. A change in surface energy can also influence plastic deformation through affecting the motion of charged defects, e.g., dislocations. Additionally, both elastic and plastic deformation can be influenced by diffusion of ionic species into the lattice.

Presently, there is a need for a micro- and nano-scale device that enables fundamental studies of many important technological issues, including stress-corrosion cracking, electrode performance under stress, mechanical property characterization of biomaterials at physiological conditions, nanotribology, and chemical-mechanical polishing (CMP). To fully understand these processes at the fundamental level, a nanoscale relationship between the structure under environmental conditions and the resultant mechanical properties must be characterized in real time.

SUMMARY OF THE INVENTION

This invention is a MEMS device for micro-to-nanoscale characterization of a material contained within an atmospheric environmental cell with quantitative mechanical tensile testing within a cavity that is sandwiched between electron transparent membranes. The main features include a sealed environmental chamber comprising a sample holder for physical control of a sample and a membrane window for transmitting radiation into the sealed environmental chamber for characterization of the sample; and a moveable piston attached to the sample holder for applying a mechanical force to the sample, wherein the piston can be moved by an actuator external to the sealed environmental chamber. The device can further comprise a heater for heating the environment, electrical contacts connected to the sample for electrochemical measurements, and a sensor connected to the actuator to provide quantitative measurement of the piston displacement. The device can be fabricated using surface and bulk silicon micromachining.

The invention provides the capability to perform small-scale quantitative mechanical testing of a material sample in an enclosed, controlled (chemical and temperature) environment where both sensing and actuation can be achieved by MEMS devices. The invention enables micro- and nano-scale materials to be mechanically tested in liquids, gases or vacuum. Because the sample chamber is sealed, testing can be conducted in high-vacuum or ambient conditions enabling a diverse array of in-situ characterization techniques including electron microscopy, x-ray microscopy and x-ray microdiffraction. Buried electrodes in the environmental chamber allow for electrical contacts to be patterned to the sample, to test the electrical and mechanical properties of the sample under environmental conditions or to provide localized heating. The device can be of small dimensions to enable function within the pole-piece gap of a transmission electron microscope (TEM). Therefore, the device can be on the order of several millimeters in length and width, and the thickness of the lid and base together can be on the order of 1 mm. The environmental chamber's height in the sample region between the electron-transparent membrane windows can be less than 1 µm, and preferably about 400 nm. The electron-transparent membrane windows can have an area of about tens of µm$^2$ and thickness between 20 and 100 nm.

BRIEF DESCRIPTION OF THE DRAWINGS

The detailed description will refer to the following drawings, wherein like elements are referred to by like numbers.

DETAILED DESCRIPTION OF THE INVENTION

Figure 1:
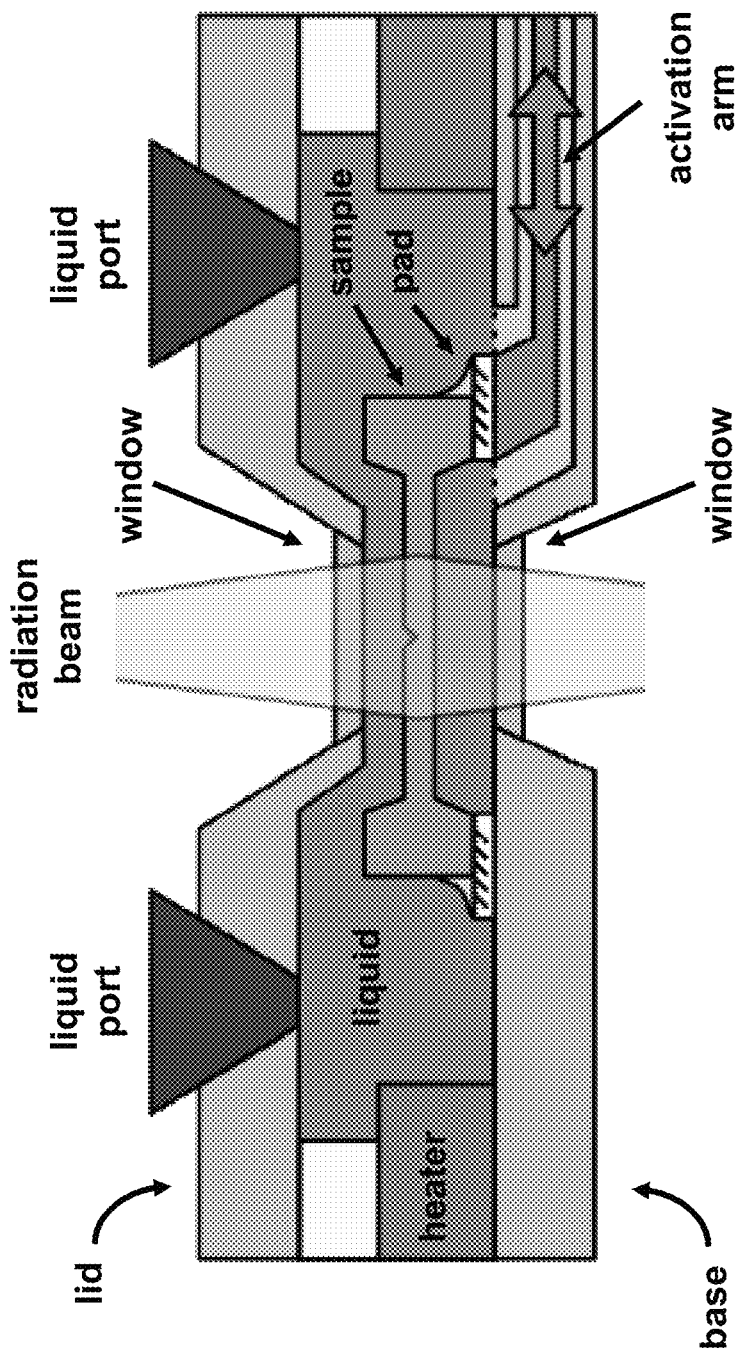
FIG. 1 is a conceptual illustration of an environmentally controlled thermal-mechanical MEMS device for micro-to-nanoscale characterization.

FIG. 1 shows a conceptual MEMS-based device for elevated temperature control within a hermetically-sealed, confined environment for testing the mechanical properties of micro- or nanoscale samples in between two electron transparent membrane windows for imaging with photons, electrons, or x-rays. The device comprises a buried movable piston activation arm attached to the sample holder. The sample is suspended over a window with rib features, which prevents stiction of the sample and window. The sample can be contained in a liquid or gas. The environment and sample can be heated via a heater at the peripheral seal rings. Buried electrical traces can be exposed in the environmental chamber to enable the connection of electrodes to the sample for electrochemical control during mechanical testing. The device can use both low and high force actuators.

Figure 2A:
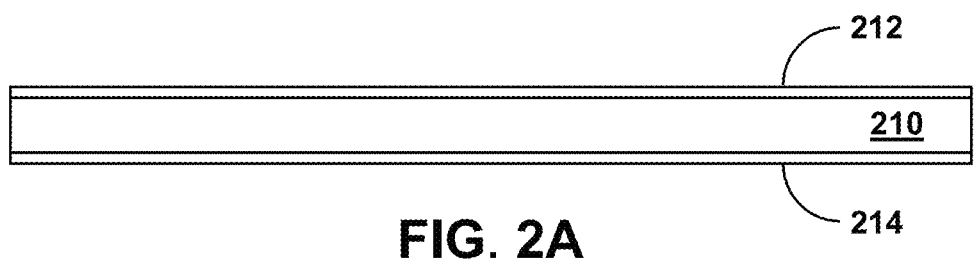
FIGS. 2A-2U illustrate a method to fabricate the device base.
Figure 2B:
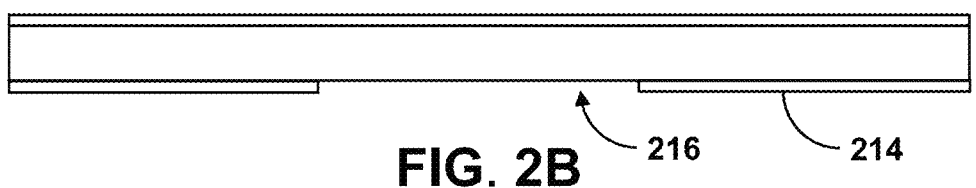
Figure 2C:
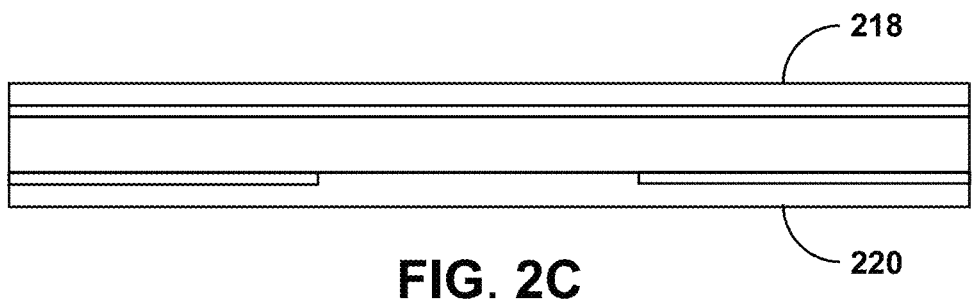
Figure 2D:
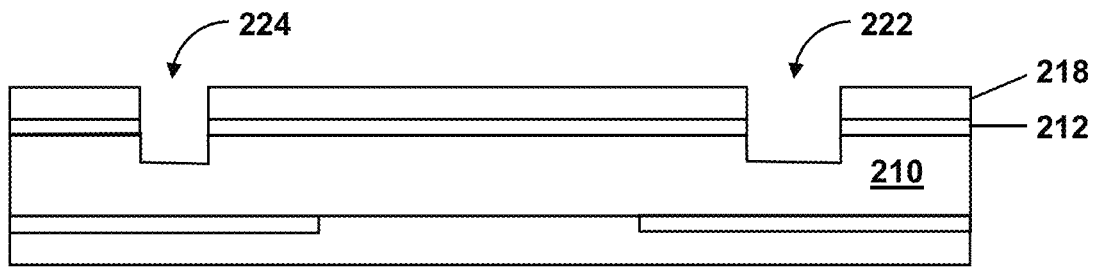
Figure 2E:
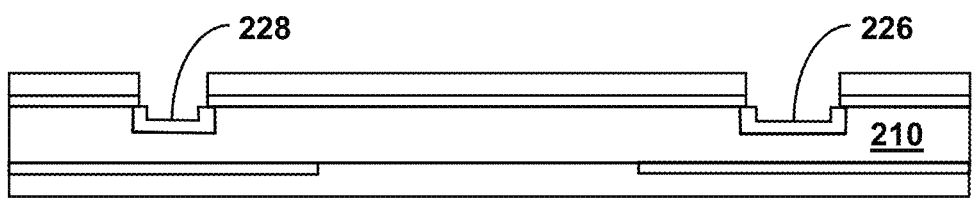
Figure 2F:
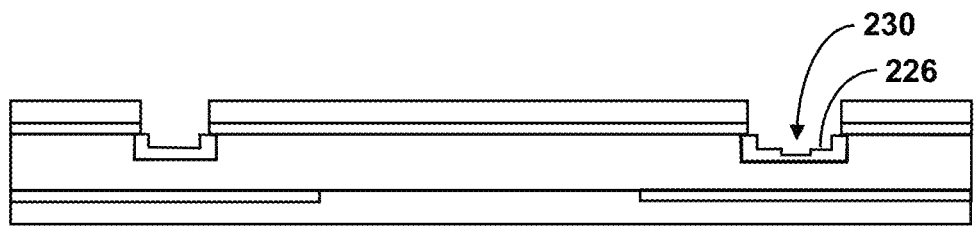
Figure 2G:
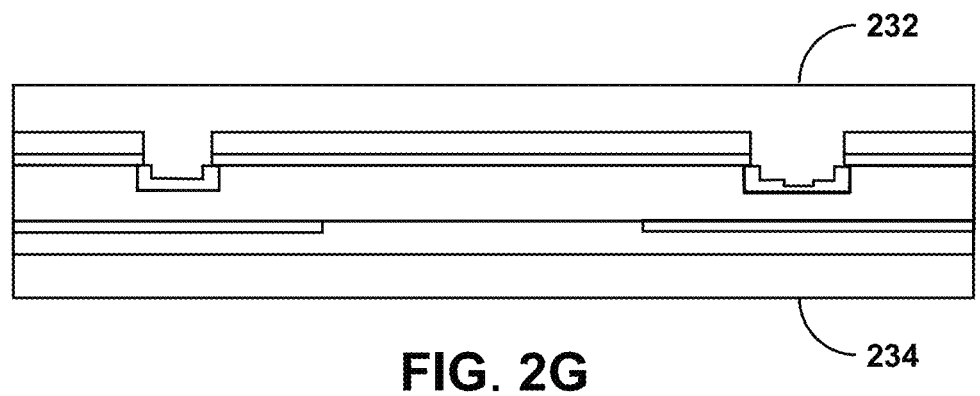
Figure 2H:
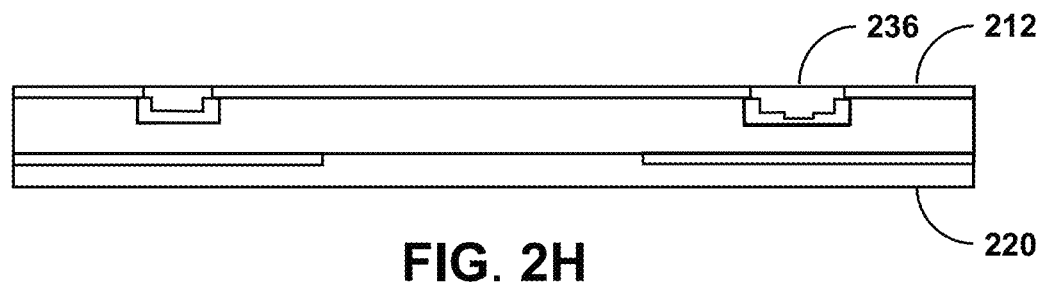
Figure 2I:
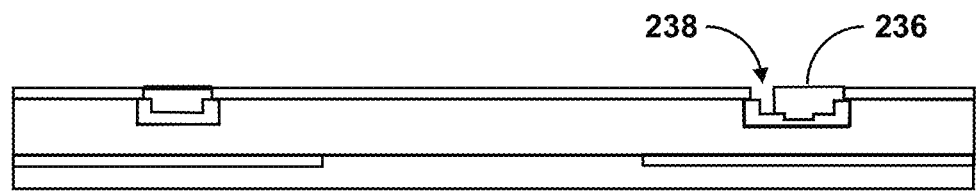
Figure 2J:
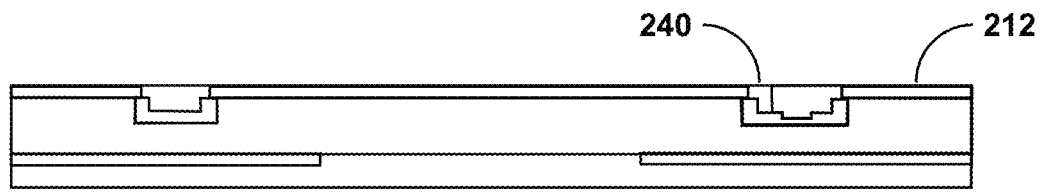
Figure 2K:
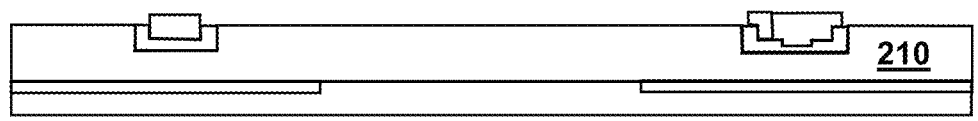
Figure 2L:
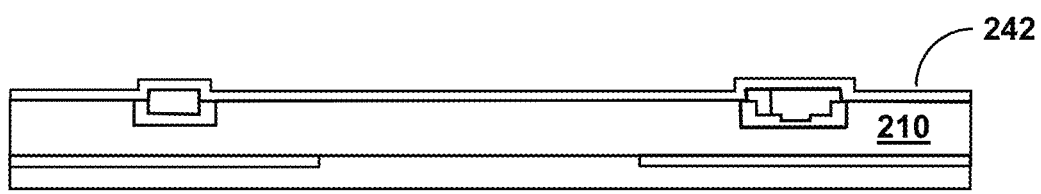
Figure 2M:
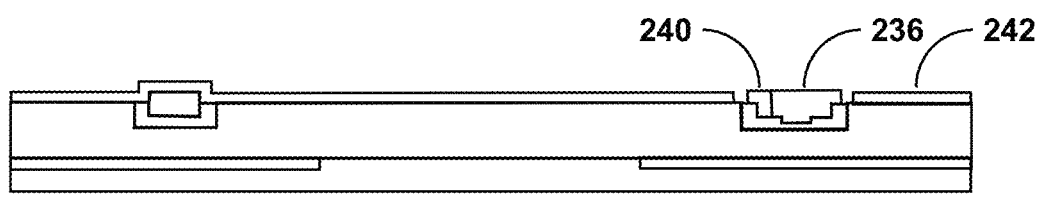
Figure 2N:
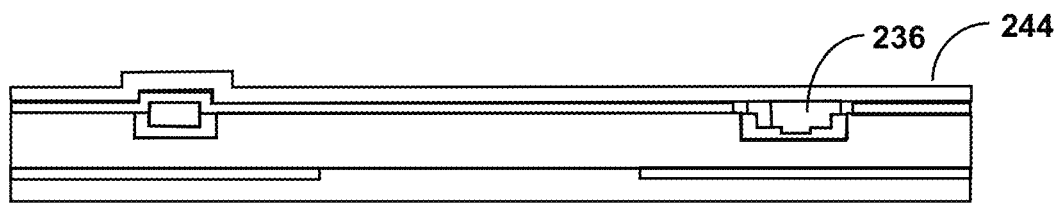
Figure 2O:
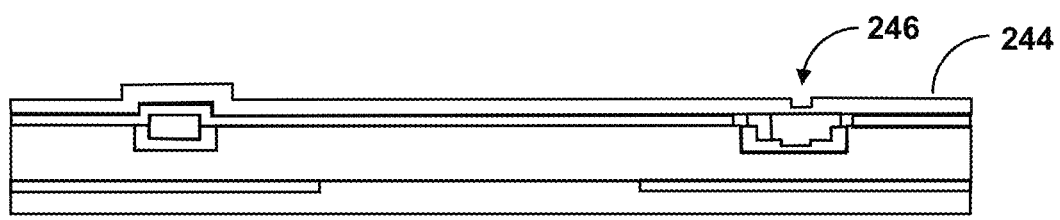
Figure 2P:
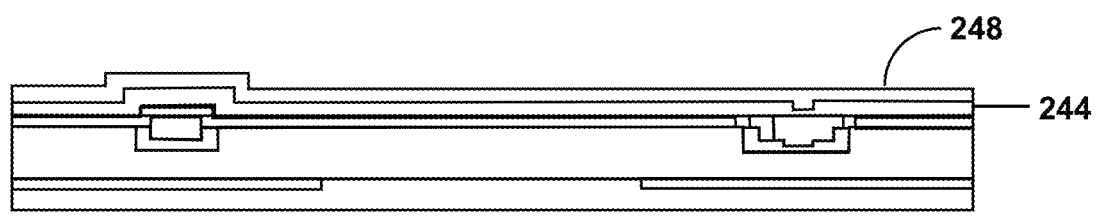
Figure 2Q:
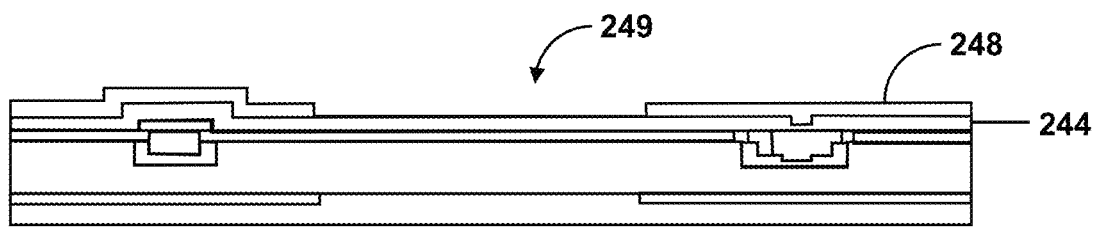
Figure 2R:
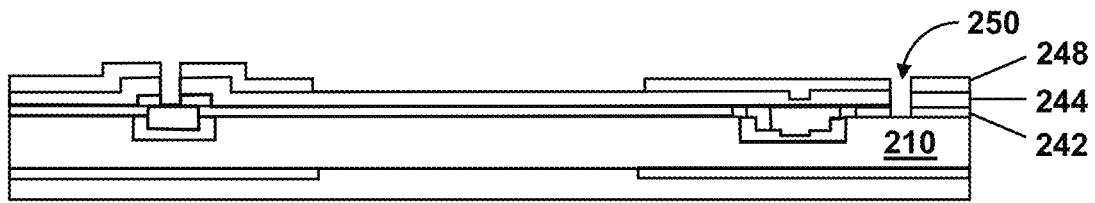
Figure 2S:
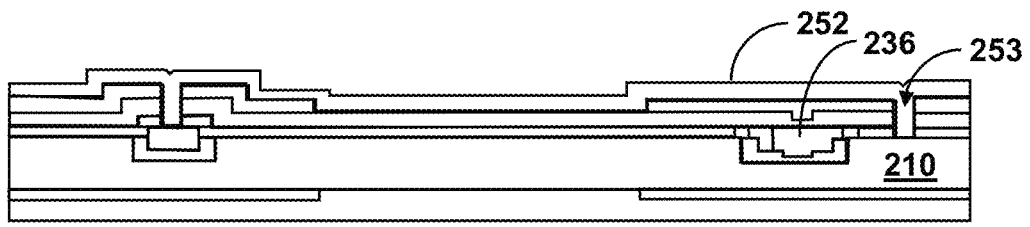
Figure 2T:
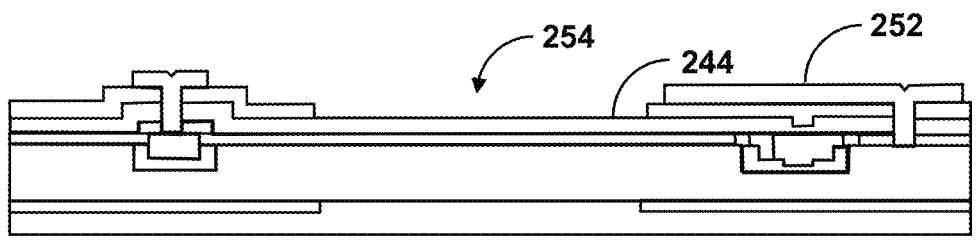
Figure 2U:
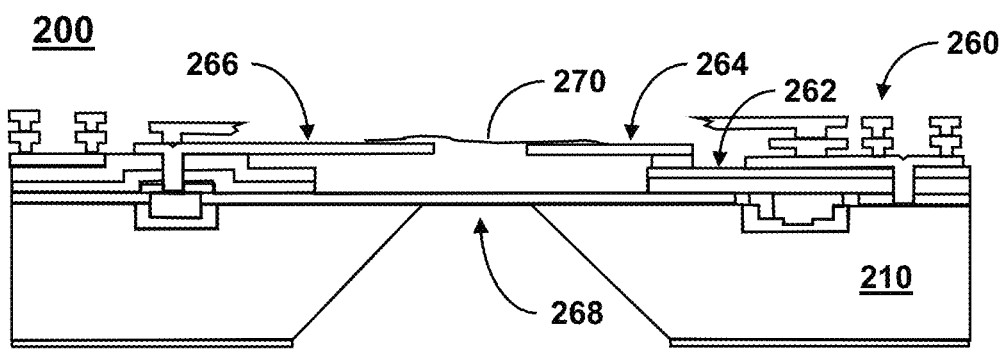

A base 200 can be fabricated using both surface and bulk silicon micromachining according to the steps shown in FIGS. 2A-2U.

As shown in FIG. 2A, starting with a n-type double side polished (100) silicon wafer 210 low-stress silicon nitride (LSN) films 212 and 214 are applied to both the front side and back side surfaces of the substrate 210. In subsequent steps, the LSN films 212 and 214 will be used as a stopping film for chemical mechanical polishing (CMP) on the front side of the polysilicon buried trace, mechanical piston, and oxide spacer fill, and on the back side as a mask for potassium hydroxide (KOH) anisotropic etching.

As shown in FIG. 2B, the LSN film 214 is patterned on the backside to provide a mask 216 for the KOH anisotropic etching.

As shown in FIG. 2C, oxide films 218 and 220 are then applied to both sides to act as a hard mask material for front side patterning and to protect the backside mask 216.

As shown in FIG. 2D, the top oxide layer 218, LSN layer 212, and the silicon substrate 210 are patterned to provide trenches 222 and 224 on the front side.

As shown in FIG. 2E, the exposed silicon substrate 210 is then thermally oxidized in the patterned trenches 222 and 224 to create oxides 226 and 228 to provide a sacrificial layer for the polysilicon movable piston and for insulation of the polysilicon electrical traces.

As shown in FIG. 2F, dimple features 230 are patterned into the thermal oxide 226 to provide standoff protrusions that prevent stiction on the piston feature.

As shown in FIG. 2G, polysilicon layers 232 and 234 are deposited to completely fill the features in the substrate and cover both sides of the wafer.

As shown in FIG. 2H, the polysilicon 234 is completely etched away from the backside of the wafer and the front side polysilicon 232 is CMP polished, landing on the LSN stopping film 212 to leave piston polysilicon 236 in the trench 222.

As shown in FIG. 2I, the piston polysilicon 236 is patterned to remove some material and provide a gap 238 which will allow the piston room to move in a particular direction.

As shown in FIG. 2J, the gap 238 is filled with sacrificial oxide 240 and CMP polished, landing on the LSN stopping layer 212.

As shown in FIG. 2K, the LSN stopping layer 212 is then etched away to expose the front surface of the substrate 210.

As shown in FIG. 2L, a layer of window LSN 242 is deposited on the front surface of the substrate 210 to later provide an x-ray or electron-transparent window.

As shown in FIG. 2M, the window LSN 242 is etched away over the moveable piston polysilicon 236 so that the sacrificial oxide 240 can be removed at a later point in the fabrication process.

As shown in FIG. 2N, a layer of oxide 244 is deposited on the front side to provide electrical insulation and a sacrificial oxide around the polysilicon piston 236.

As shown in FIG. 2O, a dimple pattern 246 is etched partially into the oxide 244 over the moveable piston 236 to constrain the movement of the piston out of plane.

As shown in FIG. 2P, a LSN release barrier layer 248 is deposited over the oxide layer 244.

As shown in FIG. 2Q, the LSN release barrier layer 248 is patterned, the etched portion 249 landing on the insulating oxide 244 allowing access to the sacrificial oxide layer for later removal.

As shown in FIG. 2R, the LSN release barrier layer 248, insulating oxide layer 244, and the window LSN 242 are etched to create a trench 250 to the silicon wafer substrate 210 and create the anchor point to the piston arm.

As shown in FIG. 2S, a poly0 layer 252 is applied to the front surface, which creates an anchor 253 to the substrate 210 and the piston arm 236 as well as buried interconnects.

As shown in FIG. 2T, the poly0 layer 252 is then patterned, the etched portion 254 landing on the oxide layer 244, and forming the basis for creating the MEMS actuator.

From this point, MEMS actuators 260 are created using typical MEMS micromachining fabrication techniques such as in the SUMMiT process, as shown in FIG. 2U. The actuator 260 is anchored to the movable piston 262 which will transfer motion to a movable anchor block 264 that can be used to hold and pull on a sample 270. The sample 270 can be tacked to the movable anchor block 264 and a stationary anchor block 266. The substrate 210 is etched from behind so as to reveal the LSN window 268.

A lid 300 can be fabricated using both surface and bulk silicon micromachining according to the steps shown in FIGS. 3A-3E.

Figure 3A:
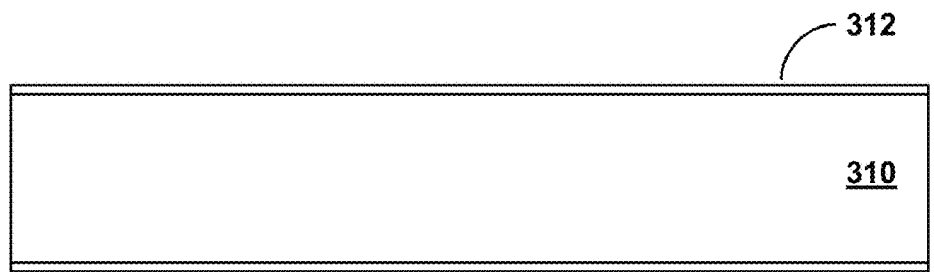
FIGS. 3A-3E illustrate a method to fabricate the device lid.

As shown in FIG. 3A, starting with a n-type double side polished (100) silicon wafer 310, LSN films 312 and 314 are applied to both surfaces.

Figure 3B:
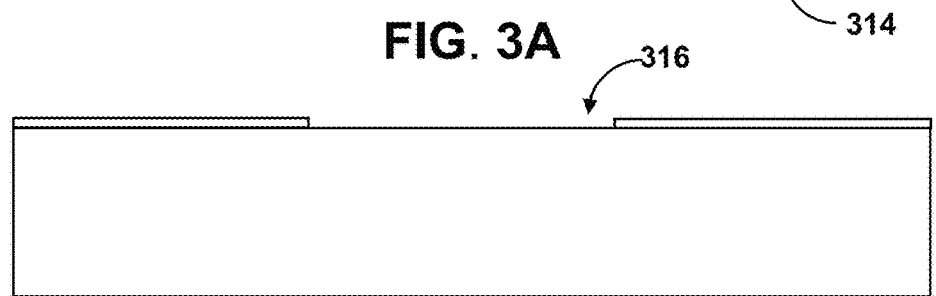

As shown in FIG. 3B, the front side LSN film 314 is then patterned for spacer pads 318 to create the required space between the lid LSN window and the base LSN window and the back side LSN film 312 is patterned 316 to be used as a hard mask for the potassium hydroxide (KOH) anisotropic etching.

Figure 3C:
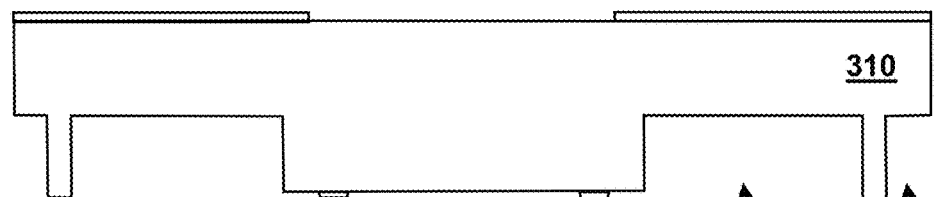

As shown in FIG. 3C, cavity spaces 320 and 322 are patterned in the substrate 310 to accommodate the MEMS actuators and a seal ring that fits into the seal ring channels of the base.

Figure 3D:
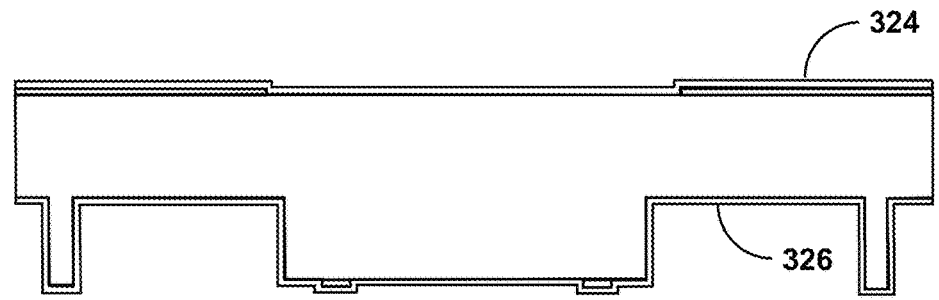

As shown in FIG. 3D, LSN 324 and 326 is deposited over both surfaces to provide a window and to protect the exposed silicon.

Figure 3E:
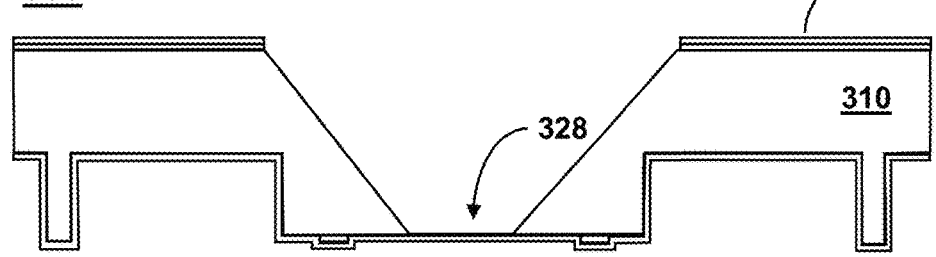

As shown in FIG. 3E, the LSN 324 and the substrate 310 are etched from the back so as to reveal the LSN window 328 on the front side.

Figure 4:
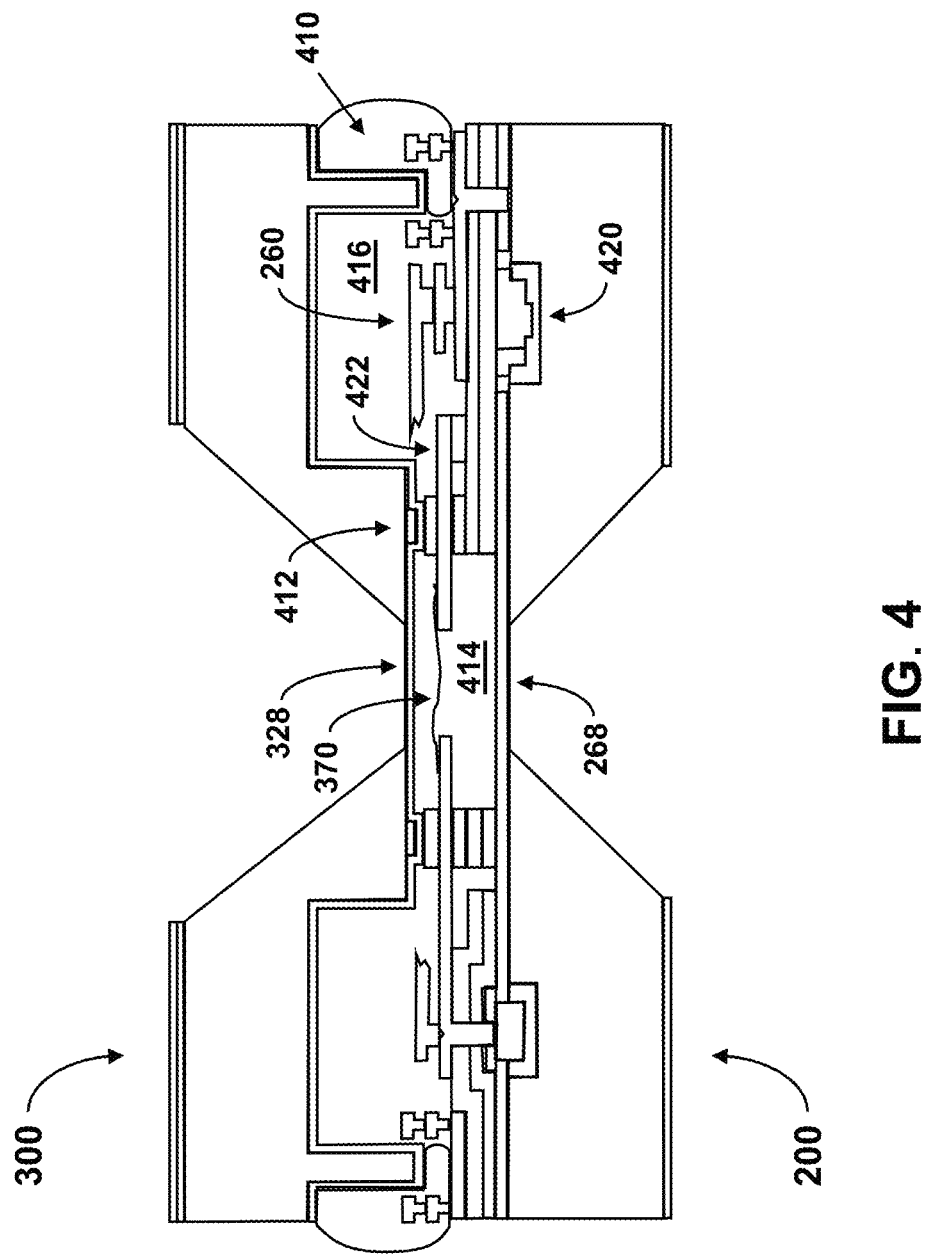
FIG. 4 is a schematic illustration of the assembled base and lid.

As shown in FIG. 4, the active mechanical-environmental-thermal MEMS device is created with silicon base and lid components using surface micromachining and bulk silicon KOH fabrication techniques to expose window membranes 328 and 268. The base 200 and lid 300 are assembled using a clock and key' type configuration where the lid seal ring 410 fits into a channel in the base. Adhesive is applied to the outside of the chips and capillary forces cause wicking of the adhesive between the lid and base which stops at the seal ring. A secondary seal ring 412 and a sealed environmental chamber 414 is thereby created that contains the fluid and restricts the fluid from escaping into the MEMS actuator region 416. The buried piston 420 is designed to transfer the MEMS actuator motion 422 from the outside dry chamber 416 to the interior secondary chamber 414 where the fluid and sample 370 reside. The piston arm below the surface that transfers motion to the sample holder has a hydrophobic self-assembled monolayer coating applied, which keeps any fluid from leaking out of the chamber 414 into the dry chamber 416 where the MEMS actuator 260 operates.

Figures 5A, 5B:
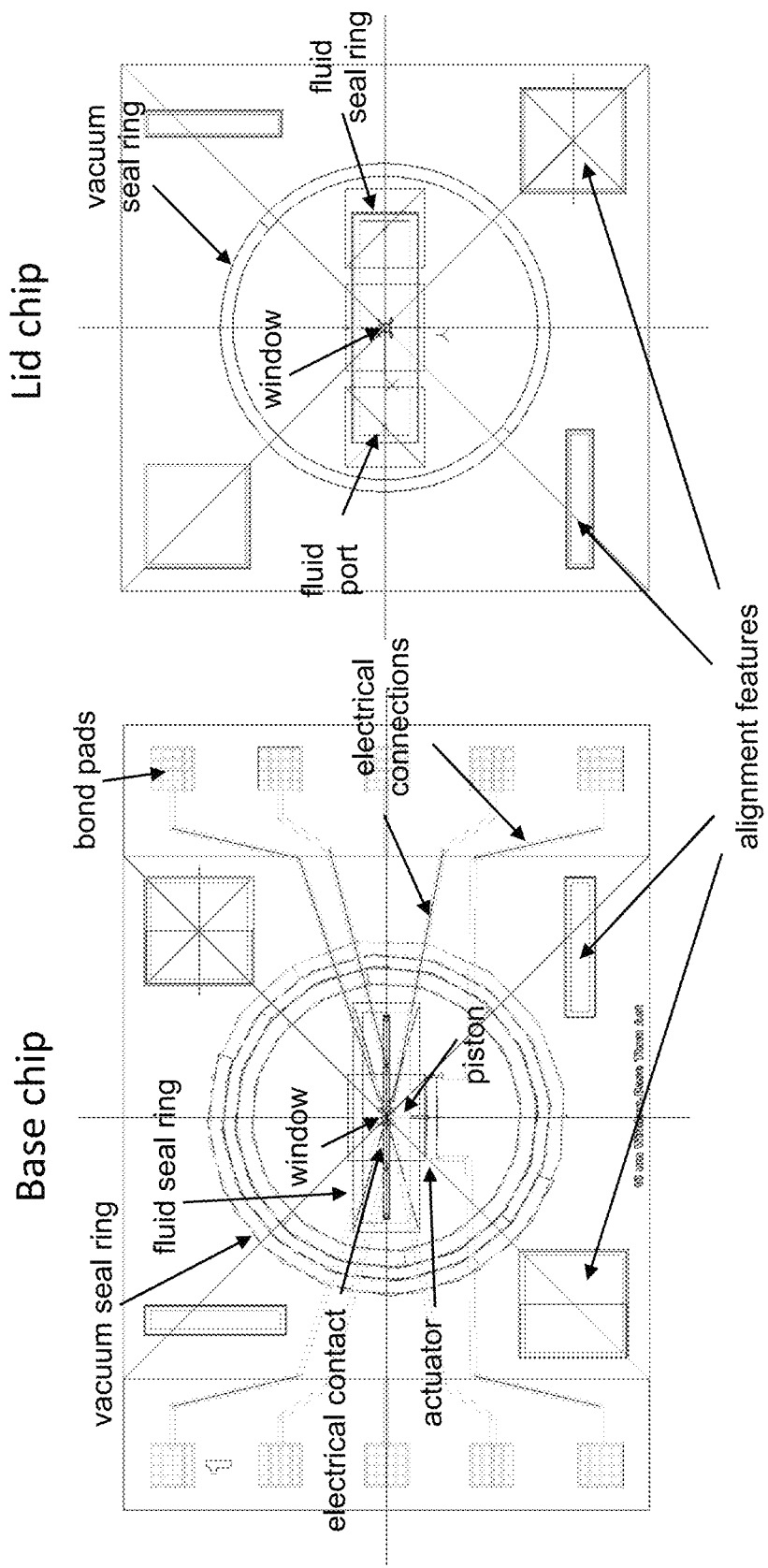
FIGS. 5A and 5B are schematic illustrations of base and lid chips.

As shown in FIGS. 5A and 5B, alignment features are created using the KOH etch that allow for rough alignment of the lid and base chips using either ball lenses or small pieces of fiber optic cable. A large circular seal ring gives a fine alignment clock and key' configuration so the LSN windows are aligned. The lid has two KOH etched ports that allow the fluid to be introduced after assembly of the lid and base chips.

The present invention has been described as an active mechanical-environmental-thermal MEMS device for nanoscale characterization. It will be understood that the above description is merely illustrative of the applications of the principles of the present invention, the scope of which is to be determined by the claims viewed in light of the specification. Other variants and modifications of the invention will be apparent to those of skill-in-the-art.

We claim:

1. A EMS device for micro-to-nanoscale characterization, comprising:
    a sealed environmental chamber comprising a sample holder for physical control of a material sample and a membrane window for transmitting radiation into the sealed environmental chamber for characterization of the material sample; and
    a moveable piston attached to the sample holder for applying a mechanical force to the material sample, herein the piston can be moved by an actuator external to the sealed environmental chamber.

2. The MEMS device of claim 1, wherein the device is fabricated using surface and bulk silicon micromachining.

3. The MEMS device of claim 1, further comprising a heater for heating the material sample.

4. The MEMS device of claim 1, further corn comprising electrical contacts connected to the material sample for electrochemical measurement.

5. The MEMS device of claim 1, further comprising a sensor connected to the actuator that provides quantitative measurement of the piston displacement.

6. The MEMS device of claim 1, wherein the radiation comprises photons, electrons, or x-rays.

7. The EMS device of claim 1, wherein the membrane window comprise silicon nitride.

8. The MEMS device of claim 1, wherein the membrane window has a thickness of less than 100 nm.

9. The MEMS device of claim 1, wherein the distance between the membrane window and the material sample is less than 1 μm.

10. The MEMS device of claim 1, further comprising and a second membrane window for transmitting radiation from the material sample out of the sealed environmental chamber.

11. The MEMS device of claim 1, wherein the radiation transmitted into the sealed environmental chamber comprises an electron beam of a transmission electron microscope and wherein the membrane is transparent to the electron beam.

12. The MEMS ice of claim 1, wherein the mechanical force comprises a tensile force.

* * * * *